June 30, 1970  R. W. HALL  3,517,873
MACHINE FOR FORMING A TRIM STRIP
Original Filed Oct. 19, 1967  10 Sheets-Sheet 2

INVENTOR.
RALPH W. HALL
BY Pearce & Schauperklaus

June 30, 1970  R. W. HALL  3,517,873
MACHINE FOR FORMING A TRIM STRIP
Original Filed Oct. 19, 1967  10 Sheets-Sheet 4

INVENTOR.
RALPH W. HALL
BY Pearce & Schaeperklaus
Attorneys

June 30, 1970 R. W. HALL 3,517,873
MACHINE FOR FORMING A TRIM STRIP
Original Filed Oct. 19, 1967 10 Sheets-Sheet 6

INVENTOR.
RALPH W. HALL
BY *Pearce and Schaeperklaus*

Attorneys

FIG. 19

INVENTOR.
RALPH W. HALL
BY Pearce & Schaeperklaus
Attorneys

FIG. 22

# United States Patent Office 3,517,873
Patented June 30, 1970

3,517,873
MACHINE FOR FORMING A TRIM STRIP
Ralph W. Hall, Colerain Township, Hamilton County, Ohio, assignor to Textron, Inc., Providence, R.I., a corporation of Rhode Island
Original application Oct. 19, 1967, Ser. No. 676,518, now Patent No. 3,485,127, dated Dec. 23, 1969. Divided and this application June 12, 1969, Ser. No. 832,598
Int. Cl. B65h 23/22
U.S. Cl. 226—113                                6 Claims

ABSTRACT OF THE DISCLOSURE

A machine for fabricating lengths of trim which receives a continuous strip of metal or the like and shapes the strip between rolls which operate as the strip advances continuously, changes the advance of the strip to an intermittent advance and punches prongs in the strip each time advance thereof stops, the distance of advance between stops being controlled by a set of distance measuring pins mounted in a turret.

---

This is a division of my copending application Ser. No. 676,518, filed Oct. 19, 1967, now Pat. No. 3,485,127 issued Dec. 23, 1969.

This invention relates to a machine for forming lengths of trim for a vehicle or the like.

An object of this invention is to provide a machine which shapes strip metal or the like into lengths of trim and punches prongs therein at selected intervals along the trim.

A further object of this invention is to provide such a machine in which the spacing of prongs can be varied or adjusted as desired.

A further object of this invention is to provide such a machine in which selected prongs can be reversed in direction.

Briefly, this invention provides a machine for fabricating lengths of trim which receives a continuous strip of metal or the like and shapes the strip between rolls which operate as the strip advances constantly. The machine then changes the advance of the continuous strip from a constant speed operation to an intermittent speed advance as the continuous strip is advanced to a punch press. At the punch press, a prong can be punched in the continuous strip each time advance thereof stops. Means is provided for advancing the continuous strip a sufficient distance after each punching operation to align it for the next punching operation. A set of distance measuring pins mounted in a turret controls the distance of advance after each operation, and changing of the pins in the turret controls the advance between punching operations. Mechanism controlled by the turret controls punch dies to determine direction of each prong. A guillotine knife or the like periodically cuts a suitable length of the continuous strip during one of the stops in advance thereof.

The above and other objects and features of the invention will be apparent to those skilled in the art to which this invention pertains from the following detailed description and the drawings, in which.

In the following detailed description and the drawings, like reference characters indicate like parts.

Figure 1:
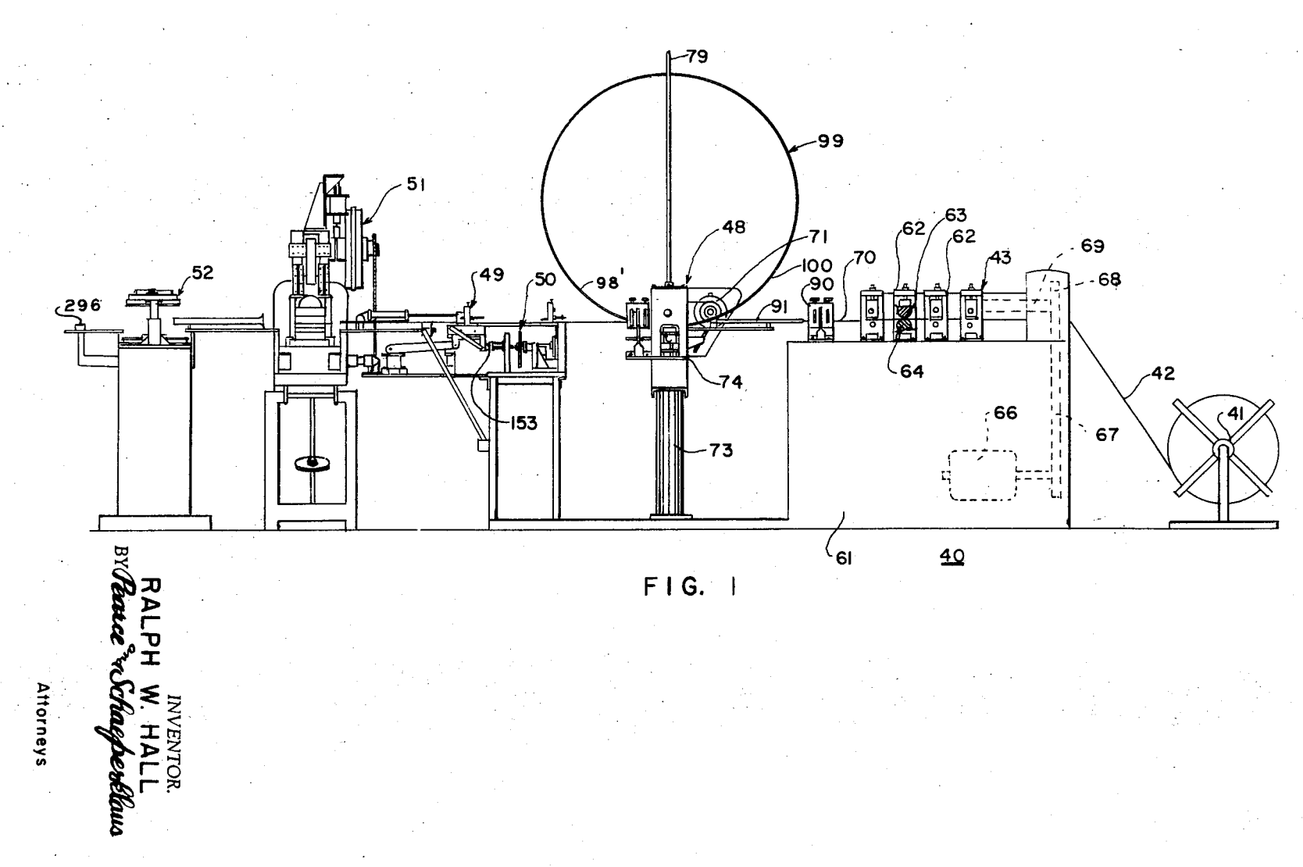
FIG. 1 is a view in front elevation of a trim forming machine constructed in accordance with an embodiment of this invention.
Figure 2:
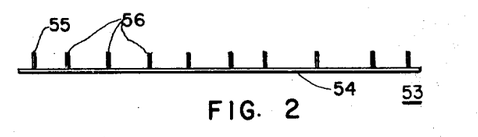
FIG. 2 is a view in front elevation of a length of trim formed on the machine illustrated in FIG. 1.
Figure 3:
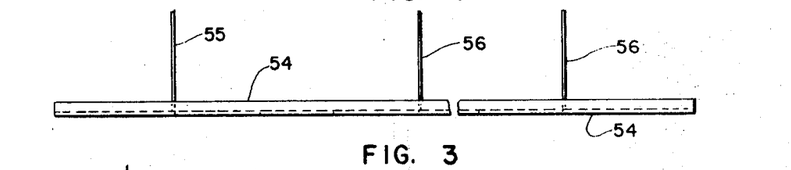
FIG. 3 is a fragmentary view in front elevation of the length of trim shown in FIG. 2 on an enlarged scale.
Figure 4:
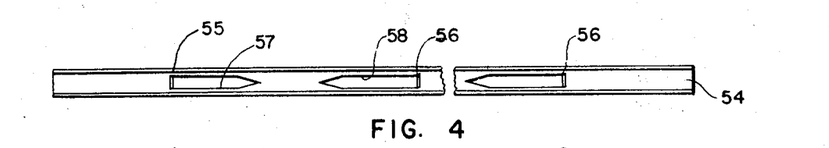
FIG. 4 is a fragmentary plan view of the length illustrated in FIGS. 2 and 3.
Figure 5:
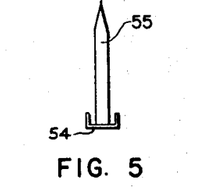
FIG. 5 is a view in end elevation of the length illustrated in FIGS. 2-4 inclusive.
Figures 6, 8:
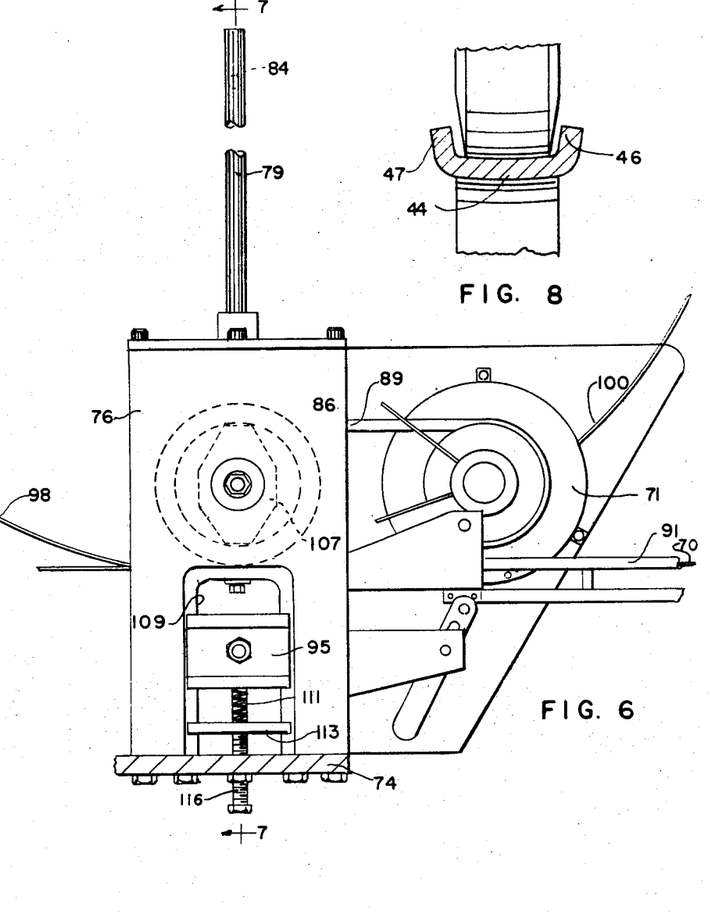
FIG. 6 is a view in front elevation on an enlarged scale of a strip advance controlling mechanism forming a part of the machine shown in FIG. 1 a support plate thereof being shown partly in section.
FIG. 8 is a fragmentary view on an enlarged scale showing gripping rollers of the strip advance controlling mechanism with the strip gripped therebetween.

In FIG. 1 is shown a trim forming machine 40 constructed in accordance with an embodiment of this invention. The machine includes a reel 41 from which an elongated flat metal strip or ribbon 42 is unrolled. The strip passes through a forming section 43 in which the strip is formed to channel shape, as shown in FIG. 8, with a web 44 and flanges 46 and 47. The strip passes through the forming section 43 at a uniform or constant speed. From the forming section 43, the strip passes to a strip advance control mechanism 48. The strip is drawn from the control mechanism 48 intermittently by a strip pulling assembly 49. The strip pulling assembly 49 is controlled by a feed control assembly 50. The assembly 49 feeds the strip to a punch press 51 which punches prongs therein. From the punch press 51, the strip passes to a guillotine knife 52 which cuts lengths 53 from the strip.

One of the trim lengths 53 is shown in FIGS. 2–5 inclusive. The trim length includes a body 54 of channel shape and a plurality of prongs 55 and 56 punched out of the web of the strip. As each prong 55 is punched from the web, an opening 57 (FIG. 4) is formed in the web, and as each prong 56 is punched from the web, an opening 58 is formed in the web. As shown most clearly in FIG. 4, the prongs 55 and 56 face in opposite directions with the opening 57 being to the right of the adjacent prong while each of the openings 58 is to the left of the adjacent prong.

FORMING SECTION

The forming section 43 (FIG. 1) includes a stand 61 on which a plurality of pairs of roll stands 62 are mounted. Each pair of roll stands supports a pair of substantially horizontal rolls 63 and 64, with the strip 42 passing between pairs of rolls to be formed thereby. A variable speed motor 66 drives the rolls. Appropriate connecting chains 67, gears 68 and supporting shafts 69 (not shown in detail) connect the motor 66 to the rolls in driving relation. During operation of the machine, the motor operates constantly to draw the strip 42 from the reel 41 and to advance a formed strip 70 toward the advance control mechanism 48. The speed at which the motor 66 operates is controlled by a rheostat 71, which is a part of the advance control mechanism 48.

ADVANCE CONTROL MECHANISM

Figure 7:
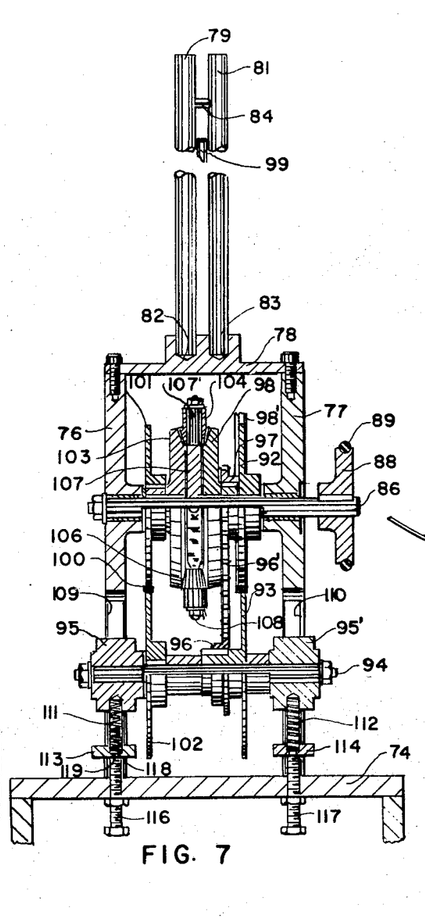
FIG. 7 is a view in section taken on the line 7—7 in FIG. 6.

The strip advance control mechanism 48 is mounted on a stand 73, which carries a support plate 74. The mechanism 48 includes upright plates 76 and 77 (FIG. 7) mounted on the support plate 74. A cross plate 78 spans upper ends of the upright plates 76 and 77 and is attached thereto. Upright spaced strip guiding rods 79 and 81 are mounted in sockets 82 and 83, respectively, of the cross plate 78. Upper ends of the rods 79 and 81 are linked by a cross bar 84.

A control shaft 86 is rotatably mounted in the plates 76 and 77. A pulley 88 mounted on the shaft 86 carries a belt 89. The belt 89 also runs on the rheostat 71 as shown in FIG. 6 so that turning of the shaft 86 operates the rheostat 71 to increase or decrease the speed at which the motor 66 (FIG. 1) advances the forming rolls to advance the formed strip 70 to the advance control mechanism 48.

The formed strip 70 leaves the forming section 43 through a guide 90 and enters the advance control mechanism 48 through a guide 91 (FIGS. 1 and 6) which directs the formed strip between rolls 92 and 93. The roll 92 is rotatably mounted on the control shaft 86. The roll 93 is rotatably mounted on a cross shaft 94 which extends between spring-pressed slide blocks 95 and 95'. A sprocket wheel 96 is keyed to the roll 93 and drives a chain 96'. The chain 96' drives a sprocket wheel 97, which is rotatably mounted on the control shaft 86. A bevel gear 98, rotatably mounted on the control shaft 86, is keyed to the sprocket wheel 96 so that the bevel gear 98 rotates at the same speed as, but in the opposite direction of, rotation of the roll 92. From the rolls 92 and 93, an upwardly advancing strip portion 98' moves upwardly forming a loop 99 (FIG. 1), which is received between the strip guiding rods 79 and 81, with a downwardly extending portion 100 of the loop extending between rolls 101 and 102. The rolls 101 and 102 are rotatably mounted on the shafts 86 and 94, respectively. A bevel gear 103 is rotatably mounted on the control shaft 86 and is keyed to the roll 101. The bevel gears 98 and 103 mesh with bevel gears 104 and 106, which are rotatably mounted on a swinging yoke 107. The yoke 107 is attached to the control shaft 86 and swings therewith. The bevel gears 104 and 106 are mounted on axes 107' and 108, respectively, which extend radially of the control shaft 86. When the upwardly extending portion of the loop 98' and the downwardly extending portion 100 of the loop 99 move at the same speed, the bevel gears 98 and 103 turn at the same speed, and the loop 99 remains of a substantially constant diameter and with the swinging yoke remaining substantially in one position. However, if one of the portions of the loop 99 moves faster than the other portion, one of the pair of bevel gears 98 and 103 turns faster than the other of the pair, and the swinging yoke 107 swings to turn the control shaft 86 and actuate the rheostat 71 to change the speed of the motor 66 in a direction to cause a change of the rate of advance of the strip through the forming section as required so that the strip is supplied to the advance control mechanism at the rate required by the rest of the machine. The spring-pressed blocks 95 and 95' move in slideways 109 and 110 in the upright plates 76 and 77, respectively. Compression springs 111 and 112 urge the blocks 95 and 95' upwardly. The compression springs 111 and 112 are seated in sockets in sliding retainers 113 and 114 which also slide in the slideways 109 and 110. The position of the sliding retainers 113 and 114 is adjusted by adjustment screws 116 and 117 which are threaded in the support plate 74. Each of the adjustment screws is provided with a cylindrical upper tip 118 received in a socket 119 in one of the sliding retainers.

STRIP PULLING ASSEMBLY

Figures 9, 23, 24:
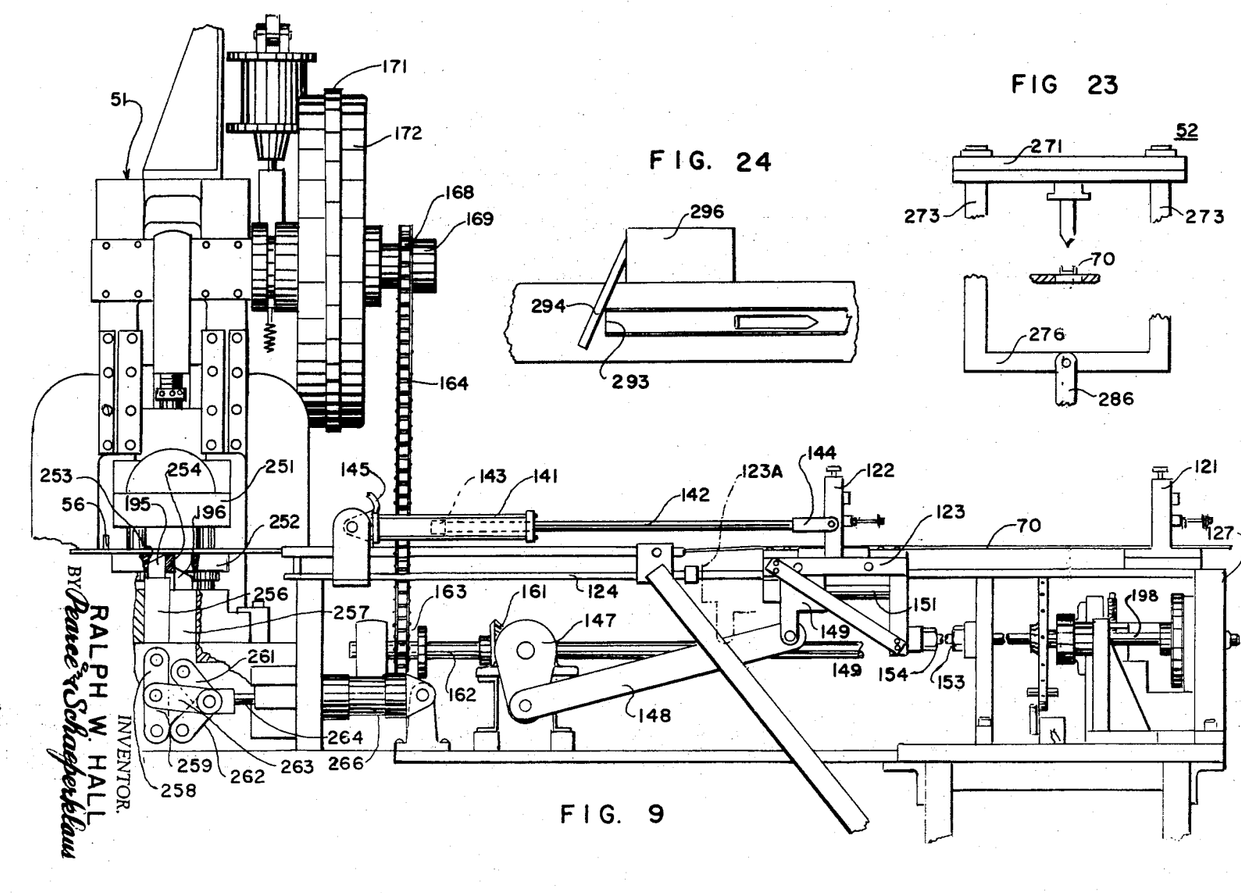
FIG. 9 is a fragmentary view in front elevation on an enlarged scale showing details of a strip pulling assembly of the machine, parts being broken away to reveal details of construction.
FIG. 23 is a fragmentary view in section taken on the line 23—23 in FIG. 19.
FIG. 24 is a fragmentary plan view taken in the didection of the arrows 24—24 in FIG. 19.

As shown in FIG. 9, the strip pulling assembly 49 includes a stationary strip gripper 121 and a moving strip gripper 122. The moving strip griupper 122 is carried by a carriage 123 whcih moves to the right and to the left as shown in FIG. 9 on a track 124. Each time the carriage 123 and the movable gripper 122 move to the left, the formed strip 70 is moved to the left as shown in FIG. 9. As the moving gripper 122 and the carriage 123 return to the right, the stationary gripper 121 prevents movement of the formed strip 70 to the right.

Figures 12, 14, 16, 17, 21:
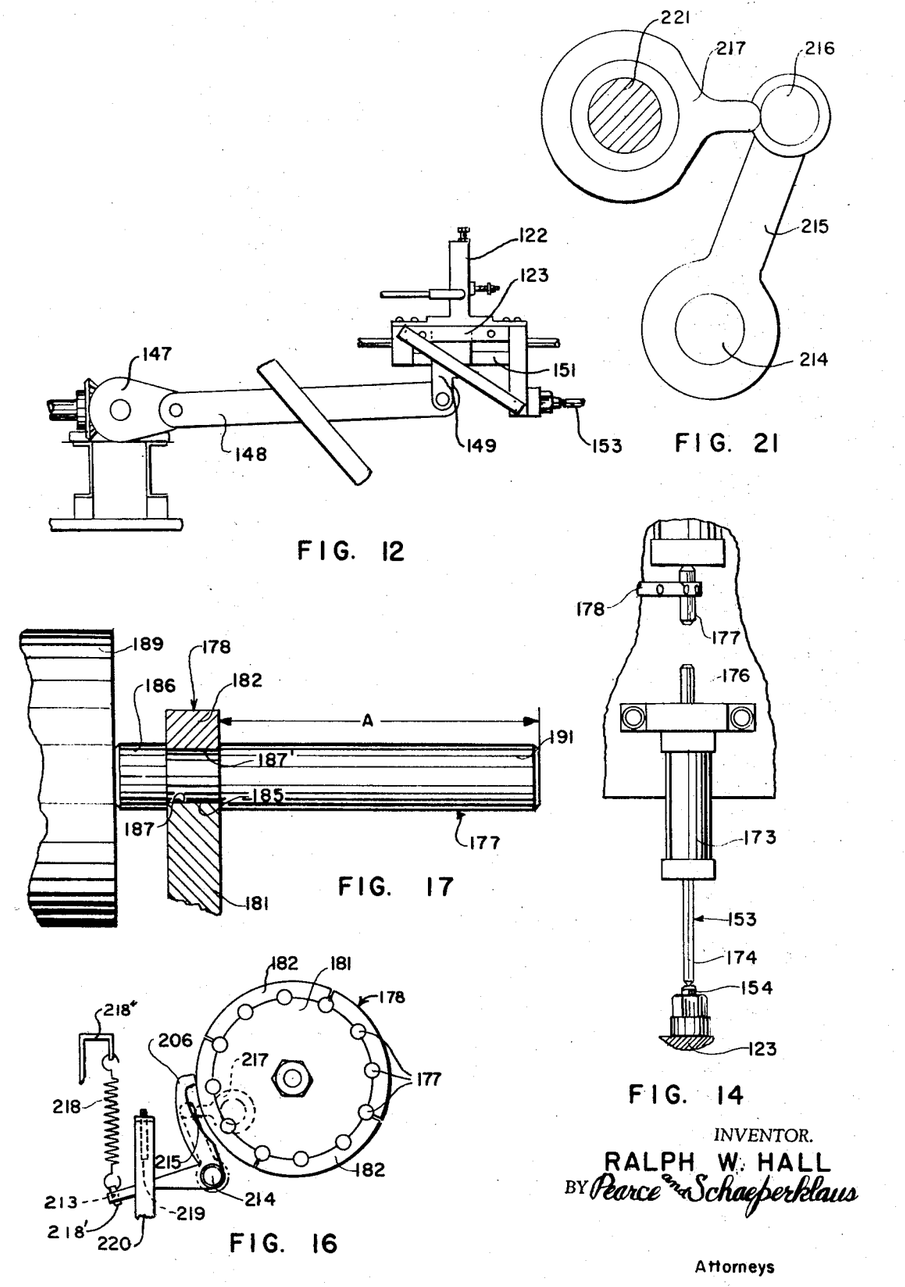
FIG. 12 is a fragmentary view in front elevation of the strip pulling assembly in an intermediate position.
FIG. 14 is a fragmentary plan view of the feed control assembly in an intermediate position.
FIG. 16 is a fragmentary view in section taken on the same line as FIG. 15 but showing the machine in an intermediate position.
FIG. 17 is a view in section taken on the line 17—17 in FIG. 15 on an enlarged scale.
FIG. 21 is a view in section taken on the line 21—21 in FIG. 13, with a cam and a cam follower in advanced position.
Figures 12A, 12B, 12C, 18:
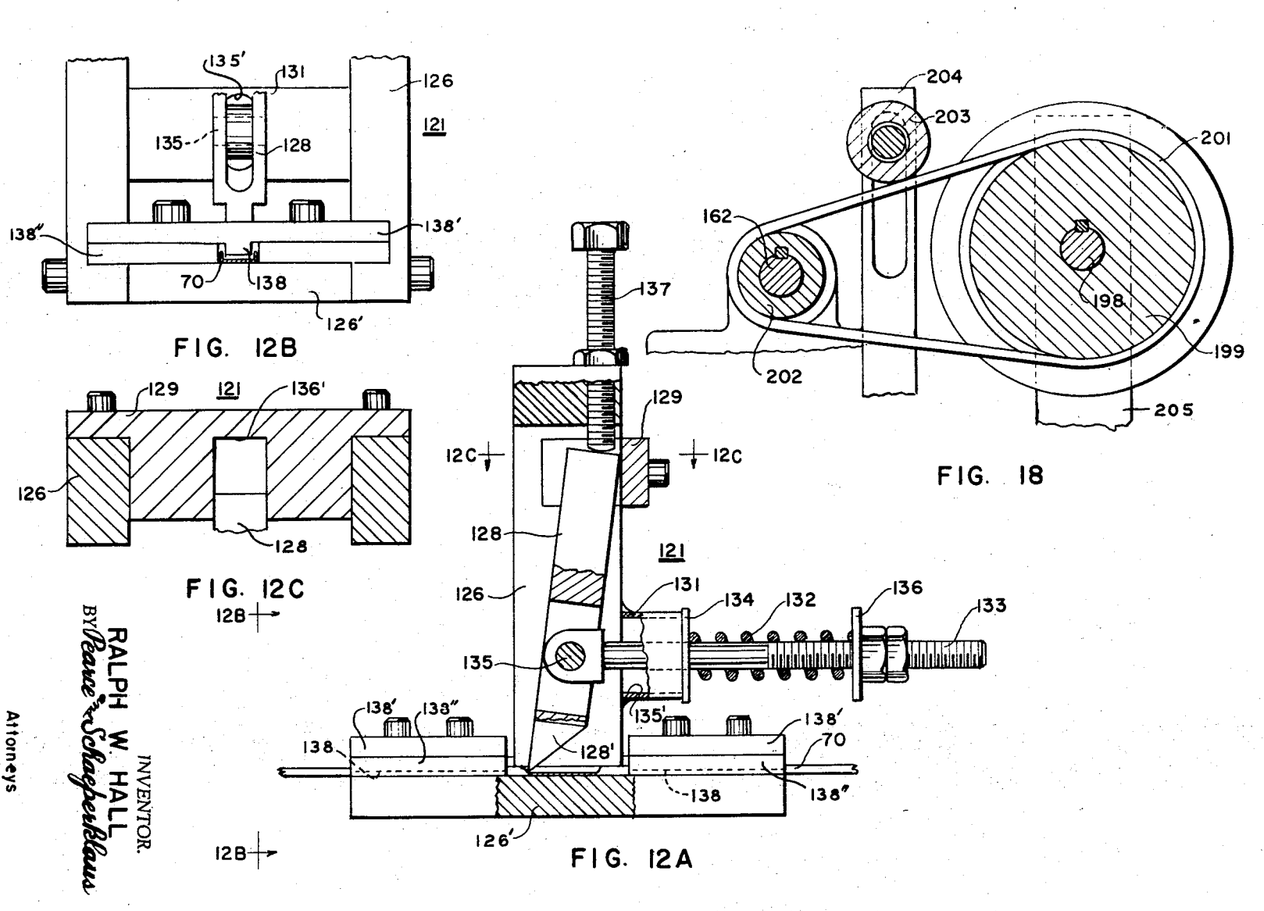
FIG. 12A is a view partly in front elevation and partly in vertical section of a stationary strip gripper of the strip pulling assembly.
FIG. 12B is a view in section taken on the line 12B—12B in FIG. 12A.
FIG. 12C is a view in section taken on the line 12C—12C in FIG. 12A.
FIG. 18 is a fragmentary view in section taken on the line 18—18 in FIG. 13.

Details of construction of the stationary gripper 121 are shown in FIGS. 12A, 12B and 12C. The gripper 121 includes a hollow generally U-shaped framework 126 which is attached to a lower plate 126' (FIG. 12A) mounted on a stationary support 127 (FIG. 9). A swinging knife 128 (FIG. 12A) is mounted inside the framework 126. A knife edge portion 128' of the swinging knife 128 is engageable with the formed strip 70. When the strip is being held by the gripper 121, the swinging knife 128 can engage cross members 129 and 131, which extend crosswise on the framework 126. A compression spring 132 mounted on a bolt 133 urges the swinging knife toward engagement with the cross members 129 and 131. The head of the bolt 133 is pivotally connected to the knife 128 by a pivot pin 135 and the spring 132 bears on a washer 136 mounted on the bolt 133 and on a washer 134 mounted on the cross member 131 with the bolt 133 extending through a slot 135' in the cross member 131. When the strip 70 moves to the left, the knife can swing away from the cross member 131 to permit the strip to advance to the left. The upper end portion of the knife 128 is received in a slot 136' (FIG. 12C) in the cross member 129 to be steadied thereby. A set screw 137 (FIG. 12A) adjusts the tightness with which the knife 128 engages the formed strip 70. Downwardly extending guide keys 138 (FIG. 12B), which are parts of cross guide frames 138', guide the formed strip 70 to the knife 128. In addition, side guide frames 138" guide sides of the formed strip 70. The lower plate 126' underlies the strip when engaged by the knife. The moving gripper 122 can be of similar construction but grips the formed strip 70 as the carriage 123 moves to the left, as shown in FIG. 9, and releases the formed strip 70 as the carriage 123 returns to the right.

The carriage is constantly urged to the right, as shown in FIG. 9, by an air cylinder 141. A piston rod 142, which carries a piston 143, is attached to the framework of the moving gripper 122 by a yoke 144. Air under pressure is introduced into the cylinder 141 through an air line 145 and urges the piston 143, the piston rod 142, the moving gripper 122, and the carriage 123 constantly to the right, as shown in FIG. 9.

The carriage 123 is drawn to the left by a crank 147 and a link 148. The link 148 is connected to a slide 149 which, as shown in FIGS. 9 and 12, can slide to the left or right along a bar 151, which is a part of the carriage 123. Each time the crank 147 makes a revolution, the carriage is returned to an initial position indicated in dot-dash lines at 123A in FIG. 9. Then, as the crank advances to the FIG. 12 position, the carriage advances to the right, being driven in that direction by the air cylinder 141, until advance of the carriage is halted by a carriage stop pin 153. A head 154 on the carriage can engage the pin. Thereafter, the slide 149 advances along the bar 151 until the crank 147 and the link 148 reach their limit position, as shown in FIG. 12 and start their return movement and, as the slide returns to the left as shown in FIGS. 9 and 12, the slide 149 picks up the carriage 123, as shown in FIG. 9, drawing the carriage 123 and the moving gripper 122 to the left to advance the formed strip 70. The distance the formed strip 70 is advanced for each revolution of the crank 147 is determined by the position at which the stop pin 153 halts advance of the carriage 123.

Figure 11:
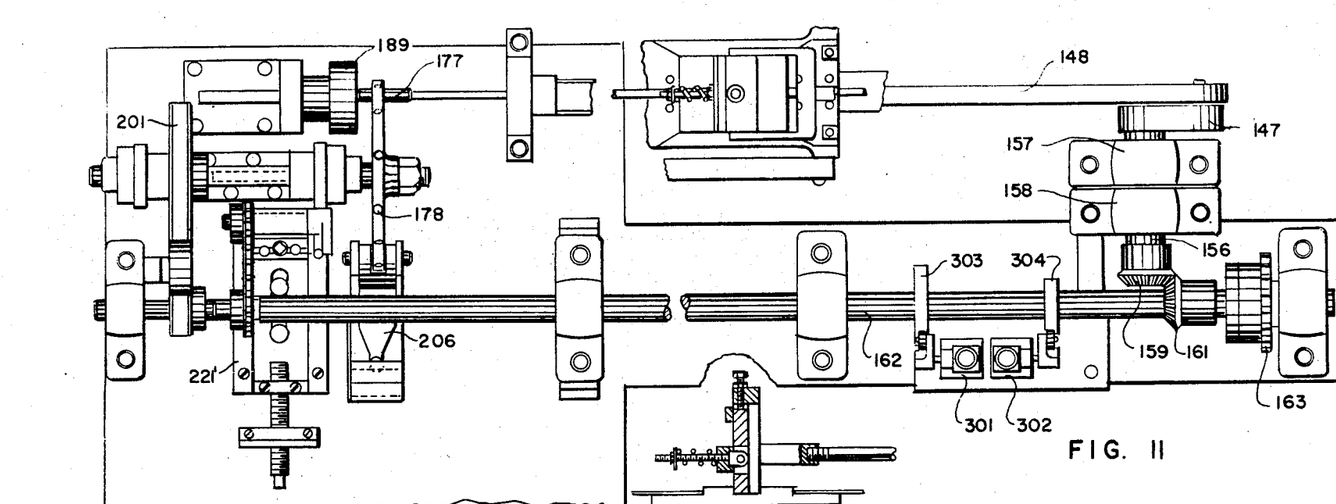
FIG. 11 is a plan view of the strip pulling assembly shown in FIG. 10, certain gauge pins being omitted for clarity.

As shown in FIG. 11, the crank 147 is carried by a cross shaft 156 journalled in bearings 157 and 158. The shaft 156 carries a bevel gear 159 which meshes with a bevel gear 161 mounted on a timing shaft 162. The timing shaft 162 carries a sprocket wheel 163 on which a drive chain 164 (FIG. 9) runs. The drive chain 164 also runs on a sprocket 168 carried by a shaft 169 of the punch press 51 so that the timing shaft 162 operates in timed relation to the punch press 51. A drive belt 171 runs on a flywheel 172 of the punch press to drive the punch press shaft 169. An appropriate drive means (not shown) drives the belt 171.

FEED CONTROL ASSEMBLY

Figure 13:
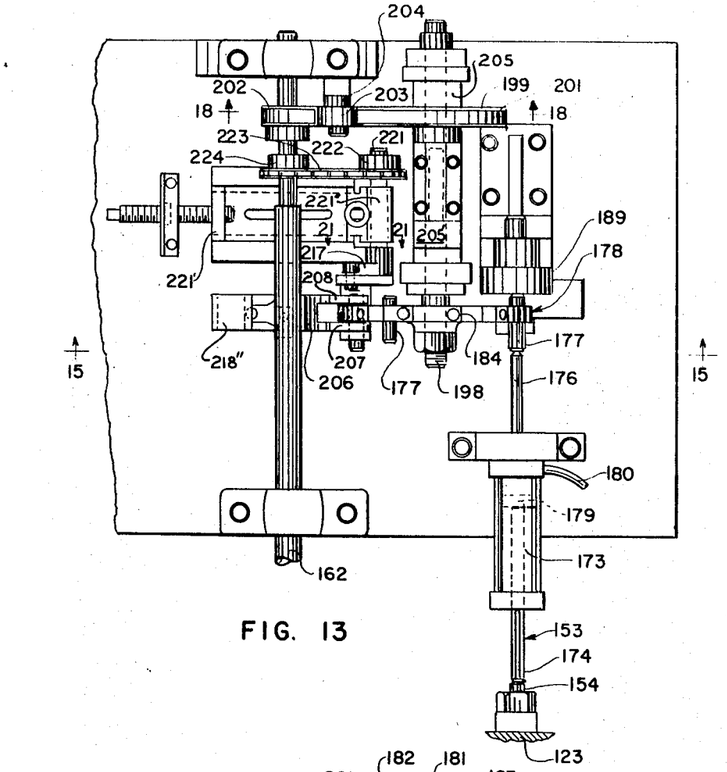
FIG. 13 is a fragmentary plan view of a feed control assembly of the machine.

The position of the stop pin 153 at which the stop pin halts advance of the carriage 123 is controlled by the feed control assembly 50 (FIG. 1), details of construction of which are shown in FIGS. 13–18 inclusive, 20 and 21. The stop pin 153 is mounted in an air cylinder 173 (FIG. 13) with one end portion 174 of the pin extending into position for engagement with the carriage head 154 and an opposite end portion 176 engageable with gauge pins 177 carried by a turret wheel 178. A piston 179, which moves in the air cylinder 173, is mounted on the stop pin 153. Air under pressure introduced into the air cylinder 173 through a line 180 urges the piston 179 and the stop pin 153 toward the carriage 123 so that the stop pin follows the carriage head 154, as shown in FIGS. 13 and 14.

Figure 15:
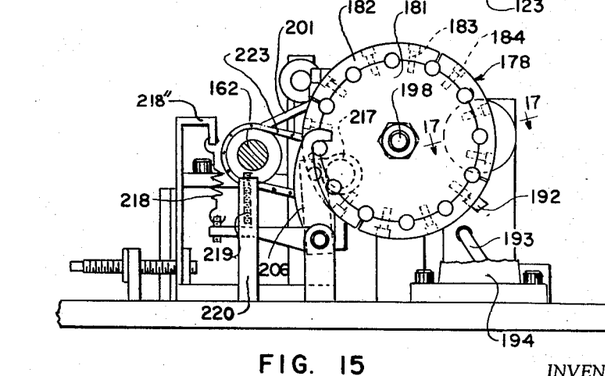
FIG. 15 is a view in section taken on the line 15—15 in FIG. 13.

As shown in FIGS. 15 and 16, the turret wheel 178 includes a body 181 and a plurality of arcuate outer sections 182 attached to the body by fasteners 183 (FIG. 15) which are received in counterbores 184 in the arcuate sections. As shown in FIG. 17, each of the gauge pins 177 is of generally cylindrical shape and is provided with a neck 185 adjacent but spaced from a rear end portion 186 of the pin. The necks 185 are received in slots 187 and 187' in the body 181 and the arcuate sections, respectively, so that the pins are trapped in the turret wheel 178 between the body and the arcuate sections. The rear end portion 186 can engage a stationary back-up block 189. An outer end portion 191 of each pin is engageable with the stop pin 153. The length A (FIG. 17) of the outer end portion of the gauge pin determines the distance of advance of the formed strip for each cycle of the machine, and the gauge pins can be of varying lengths to provide strip advance in selected increments. A lug 192 can be mounted in one of the counterbores as shown in FIG. 15. The lug 192 is engageable with a switch actuator 193 to operate a switch 194 which controls punch members 195 and 196 (FIG. 9) of the punch press to direct selected prongs in selected directions, as will be explained more fully hereinafter.

The turret wheel 178 is mounted on a short shaft 198. The short shaft 198 also carries a pulley 199 (FIG. 18) on which a belt 201 runs. The belt 201 also runs on a pulley 202 carried by the timing shaft 162. The belt 201 is adapted to slip when turning of the short shaft 198 is restrained but to drive the short shaft 198 when it is free to turn. An idle roller 203 also runs on the belt 201 and can be adjustably positioned on a frame 204 to control the tightness of the belt 201. The short shaft 198 can be mounted on appropriate supports 205 and 205'.

Figure 20:
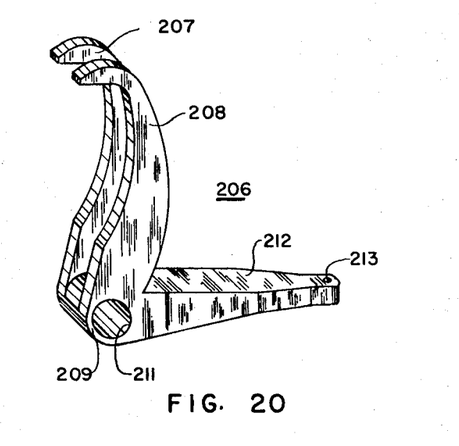
FIG. 20 is a perspective view of a hook member forming a part of the feed control assembly.

Turning of the turret wheel 178 and of the short shaft 198 is restrained periodically by a swinging hook member 206 (FIGS. 13, 15, 16 and 20). As shown in FIG. 20, the hook member 206 includes a pair of upstanding hook arms 207 and 208 which, as shown in FIG. 13, extend on opposite sides of the turret wheel 178 into position to engage the gauge pins 177. The hook member 206 also includes a body 209 (FIG. 20) having a cross bore 211 therein and an outwardly extending arm 212 having an upright bore 213 therein. The hook member is mounted on a shaft 214 (FIG. 16), which extends through the cross bore 211. The hook member shaft 214 also carries a cam follower support 215 (FIGS. 16 and 21). A cam follower 216 (FIG. 21) mounted on the cam follower support 215 is engageable by a cam 217 to swing the hook member from the FIG. 15 position to the FIG. 16 position. A tension spring 218, extending between a lug 218' mounted in the bore 213 and a stationary support 218'', urges the hook member 206 to the pin engaging position of FIG. 15. A stop pin 219 mounted in an upright frame 220 limits swinging of the hook member in this direction.

The cam 217 is mounted on a stub shaft 221 (FIGS. 13 and 21) carried by adjustable frames 221' and 221'' (FIG. 13). The stub shaft 221 carries a sprocket wheel 222 on which a chain 223 runs. The chain 223 also runs on a sprocket wheel 224 mounted on the timing shaft 162. Thus, the cam 217 turns at a constant speed in timed relation to the advance of the carriage 123, the timing being such that the cam makes one revolution for each cycle of the carriage. During each revolution of the cam 217, the hook member 206 is swung back sufficiently to release one of the gauge pins 177 so that the next gauge pin can advance to the hook member to be caught thereby, and a new gauge pin is simultaneously advanced into position for engagement by the stop pin 153. The gauge pins in the turret control the advance of the formed strip between operations of the punch press. If desired, an appropriate shim (not shown) can be positioned between the stop pin 153 and the head 154 of the carriage 123 to adjust the total distance of strip advance for a series of incremental advances.

PUNCH PRESS

From the strip pulling assembly 49 (FIG. 1) the formed strip 70 advances to the punch press 51. The punch press is generally of usual design and includes a head 251 (FIG. 9) which moves up an down as the shaft 169 turns so that the head 251 moves in timed relation to advance of the formed strip 70. The head 251, on each down stroke, engages the formed strip 70 and presses the strip downwardly against an upwardly spring-pressed table 252 forcing the table 252 and the formed strip 70 downwardly over one of the dies 195 and 196 to form a prong 56 in the strip. The die 195 extends through an opening 253 in the table 252, and the die 196 can extend through an opening 254 in the table 252. The dies 195 and 196 are mounted so that, at any one time, only one of the dies is in the raised, strip-engaging position at which the die 195 is shown. The dies 195 and 196 are mounted on rods 256 and 257, respectively. Toggle links 258 and 259 operate the die 195. Toggle links 261 and 262 operate the die 196. The toggle links are connected together by a cross link 263 and are actuated by a piston rod 264, which is pivotally connected to the cross link 263. The piston rod 264 is actuated by an air cylinder 266. A spring (not shown) in the air cylinder urges the toggle linkage to the FIG. 9 position. When air under pressure is introduced into the air cylinder 266, the toggle linkage moves to an alternate position in which the die 196 is raised and the die 195 is lowered.

CUT-OFF KNIFE

Figure 19:
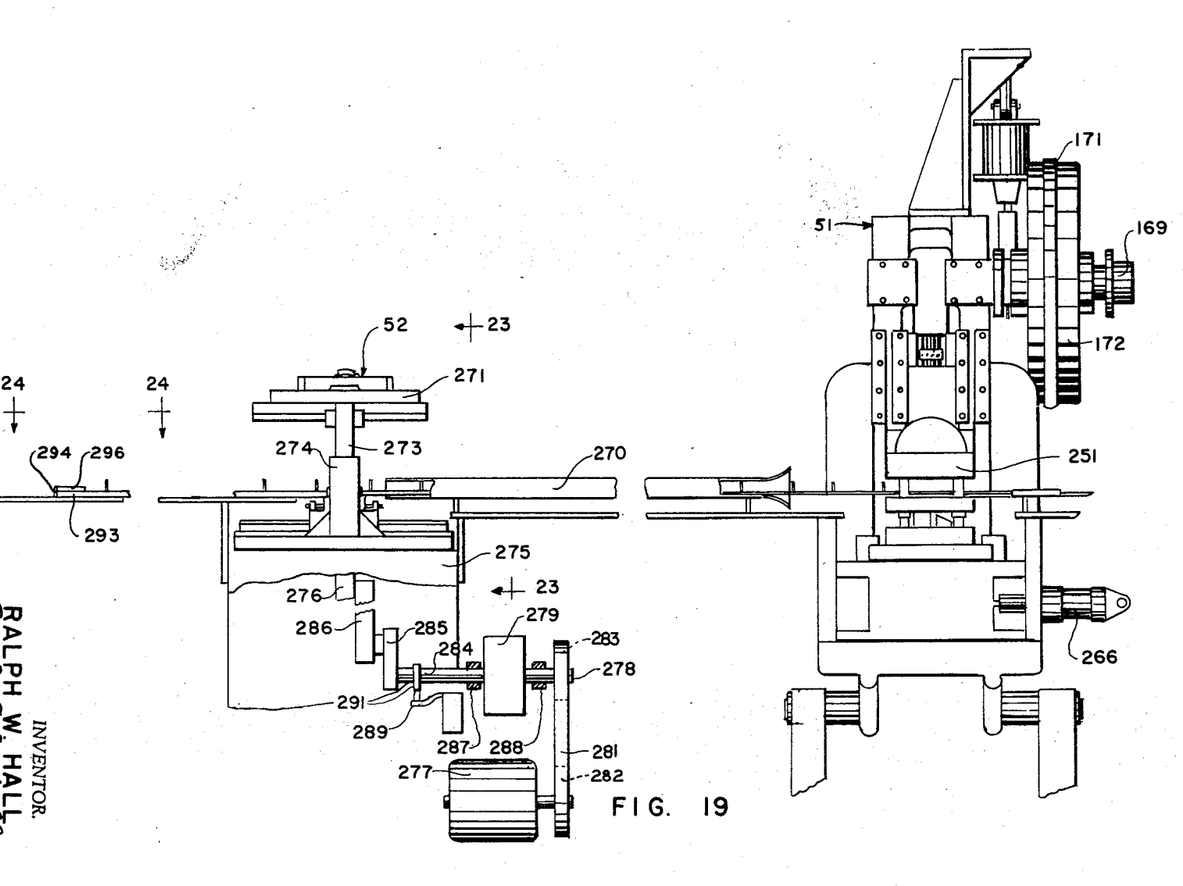
FIG. 19 is a fragmentary view in front elevation on an enlarged scale showing a punch press of the machine, drive connections of a cut-off knife assembly being shown schematically.

From the punch press 51 (FIG. 1) the strip advances to the cut-off knife assembly 52 at which a length of the strip is cut therefrom. The strip is directed to the assembly 52 through a guide 270 (FIG. 19). As shown in FIG. 23, the knife assembly includes a head 271 on the underside of which a knife blade 272 is mounted. The head 271 is carried by upright posts 273, which slide up and down in supports 274 (FIG. 19) and which are connected together inside a housing 275 by a yoke 276 (FIG. 23). The knife assembly is operated by a motor 277 (FIG. 19) which operates continuously and which drives a clutch input shaft 278 of a clutch 279. An appropriate belt 281 and pulleys 282 and 283 connect the motor 277 to the clutch input shaft 278 in driving relation. The clutch 279, when actuated, drives a clutch shaft 284 on which a crank 285 is mounted. The crank 285 is linked to the yoke 276 by a link 286. Appropriate bearings 287 and 288 support the clutch shaft 284 and the clutch input shaft 278. A limit switch 289 is actuated by a cam 291 mounted on the clutch shaft 284. Operation of the limit switch 289 will be described more fully hereinafter.

As the strip 70 passes under the knife head 271 (FIG. 19) an end portion 293 (FIG. 24) of the strip advances into engagement with a leaf actuator 294 of a switch 296. The switch 296 actuates the clutch 279 to operate the cut-off knife assembly for cutting off the length of the strip.

ELECTRICAL CIRCUIT

Figure 10:
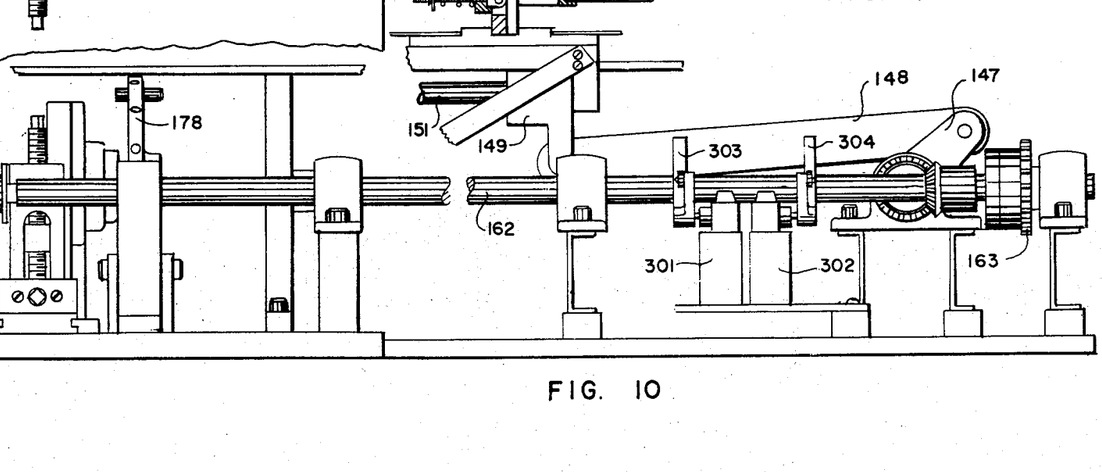
FIG. 10 is a fragmentary view in rear elevation on an enlarged scale of the strip pulling assembly, portions being broken away.
Figure 22:
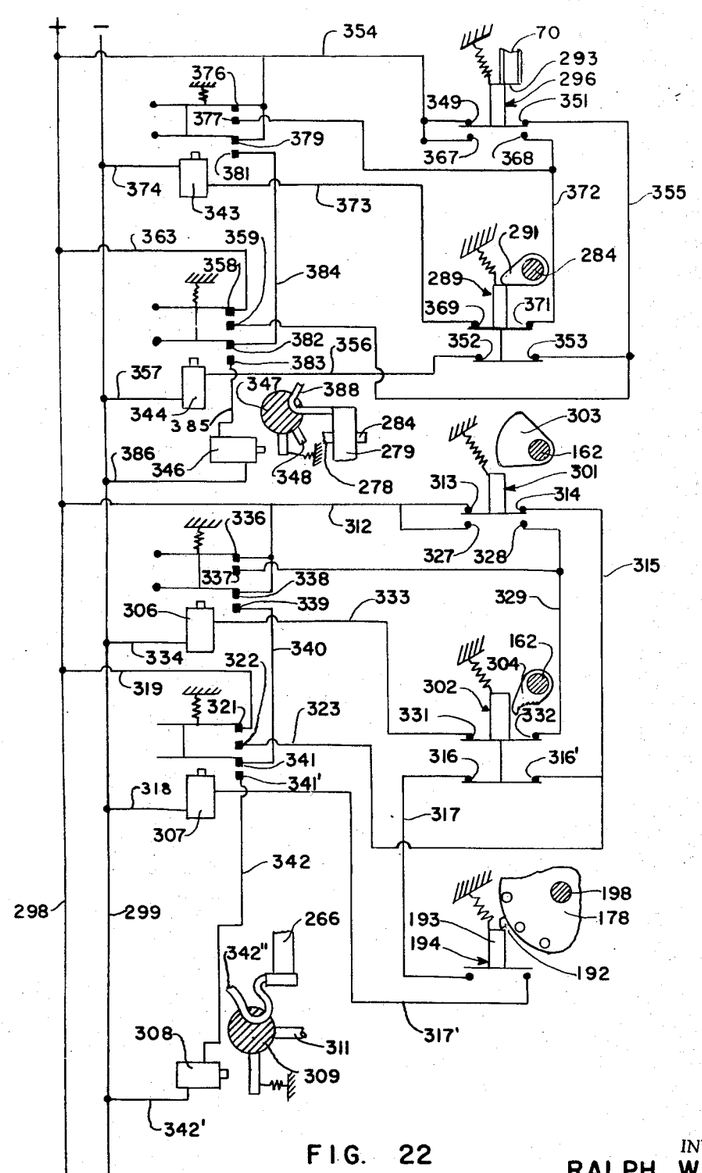
FIG. 22 is a schematic wiring diagram for the machine.

Electrical connections of the machine are shown schematically in FIG. 22. Power leads are indicated at 298 and 299. The normally open limit switch 194, which is actuated by the turret wheel lug 192, cooperates with a first cam operated switch 301 and a second cam operated switch 302 to control operation of the air cylinder 266. The switch 301 is operated by a cam 303 (FIGS. 10, 11 and 22) mounted on the timing shaft 162. The switch 302 is operated by a cam 304, which is also mounted on the timing shaft 162. Relays 306 and 307 (FIG. 22) are controlled by the switches 194, 301, and 302. When both of the relays 306 and 307 are energized, a solenoid 308 is energized to actuate an air valve 309 which can connect the air cylinder 266 to a source of air under pressure 311. As long as the switch 194 remains open, the relay 307 cannot be energized, and the air valve 309 remains in the FIG. 22 position. When the lug 192 engages the switch actuator 193 to close the switch 194, the relay 307 can be energized. The switch 302 stays in closed position except for a short moment for each revolution of the timing shaft 162. When the switch 301 is in the position shown and the switch 194 closes, the coil of the relay 307 is energized by a circuit from the power lead 298 through a lead 312 contacts 313–314 of the switch 301, a lead 315, contacts 316–316' of the switch 302, a lead 317, the contacts of the switch 193, a lead 317', the coil of the relay 307 and a lead 318 to the power lead 299. Then, when the switch 301 is moved from the position shown to its other position by the cam 303, the coil of the relay 307 remains energized by a holding circuit from the power lead 298 through a lead 319, contacts 321–322 of the relay 307, a lead 323, the contacts 316–316' of the switch 302, the contacts of the switch 194, the lead 317', the coil of the relay 307 and the lead 318 to the power lead 299. In addition, the relay 306 is energized by a circuit from the power lead 298 through the lead 312, contacts 327–328 of the switch 301, a lead 329, contacts 331–332 of the switch 302, a lead 333, the coil of the relay 306, and a lead 334 to the power lead 299. The relay 306 is kept energized by a holding circuit from the power lead 298 through the lead 312, contacts 336–337 of the relay 306, the lead 329, the contacts 331–332 of the switch 302, the lead 333, the coil of the relay 306, and the lead 334 to the power lead 299. Closing of the contacts of the relays 306 and 307 energizes the solenoid 308 through a circuit from the power lead 298, through the lead 312, contacts 338–339 of the relay 306, a lead 340 contacts 341–341' of the relay 307, a lead 342, the solenoid coil 308, and a lead 342' to the power lead 299. When the solenoid 308 is energized, the air valve 309 is swung to its other position to introduce air into the air cylinder 266 and reverse the dies of the punch press, and the dies remain in reversed position until the cam 304 opens the contacts of the switch 302, whereupon both of the relays 306 and 307 are de-energized and open to restore the air valve 309 to the position shown at which the air cylinder 266 is connected to a vent line 342" so that the dies are returned to their original position. Before the cam 303 can again move the switch 301 from the position shown to its other position, the turret wheel 178 advances to its next station releasing the switch 194 to open and stay open until the turret wheel lug 192 again closes the switch 194. The cams are so arranged that the head 251 (FIG. 9) of the punch press is raised at the time the cam 303 moves the switch 301 from the position shown to its other position, and also at the time when the cam 304 actuates the switch 302 so that pressure in the air cylinder 266 remains constant while the strip is in engagement with one of the dies, and the dies reverse only when the head 251 is raised.

The switch 296 (FIG. 22), which is actuated by the end portion 293 of the formed strip 70, and the switch 289, which is operated by the clutch shaft cam 291, control operation of the cut-off knife actuating clutch 279. The switches 289 and 296 operate relays 343 and 344. When both of the relays 343 and 344 are energized, a solenoid 346 is also energized to operate an air valve 347 and swing the air valve to a position where a source of air under pressure 348 is connected to the clutch 279 to cause the clutch to engage and cause the shafts 278 and 284 to turn together. When the switch 296 is in the position shown, the relay 344 is energized by a circuit including contacts 349–351 of the switch 296 and contacts 352–353 of the switch 289 and leads 354, 355, 356 and 357. The relay 344 is maintained closed by a holding circuit including contacts 358–359 of the relay 344, the contacts 352–353 of the switch 289, a lead 363, and the leads 355, 356 and 357. When the switch 296 is moved from the position shown by the end portion 293 of the strip 70 to its other position, the relay 343 is energized by a circuit including contacts 367–368 of the switch 296, contacts 369–371 of the relay 289, the lead 354 and leads 372, 373 and 374. The relay 343 is held closed by a holding circuit including contacts 376–377 of the relay 343, the contacts 369–371 of the relay 289, and the leads 354, 372, 373 and 374. When the relays 343 and 344 are both energized, the solenoid 346 is energized by a circuit including contacts 379–381 of the relay 343 and contacts 382–383 of the relay 344, the lead 354, and leads 384, 385 and 386. Energization of the solenoid 346 causes the air valve 347 to swing to its other position where air under pressure is introduced into the clutch 279 causing the clutch to engage and causing the shafts 278 and 284 to turn together and cause operation of the cut-off knife. The clutch 279 remains in actuated position until the cam 291 opens the switch 289, whereupon both of the relays 343 and 344 are de-energized and open de-energizing the solenoid 346 to permit the air valve 347 to return to the position shown in FIG. 22 at which the clutch 279 is connected to an air vent line 388 and the shafts 278 and 284 are disconnected so that the movement of the knife is halted until the next cut-off cycle. As the length of the strip 70 is cut away, it can be removed from the switch 296 so that the switch 296 can return to the FIG. 22 position ready to receive the next end portion of the strip 70.

OPERATION

The unformed ribbon 52 (FIG. 1) from the reel 41 is fed into the forming section 43 where it is formed to a channel shape. The formed strip issues from the forming section continuously, passing to the strip advance control assembly 48. The formed strip is drawn from the assembly 48 in periodic timed increments by the strip pulling assembly 49, and the strip advance control assembly 48 controls the rate of advance of the strip through the forming section so that the strip is formed at the speed required by the rest of the machine. The loop 99 contracts and expands sufficiently to accommodate the incremental strip advance from the assembly 48. The distance that the strip is advanced for each increment is determined by the gauge pins 177 in the turret 178 (FIG. 15). The pins can be of selected lengths and can be readily changed in order to provide differing incremental advance as required for differing product strips. The lug 192 and the switch 194 control the position of the punch press dies. Only one lug 192 is shown but, if desired, additional lugs can be mounted on the turret wheel to provide additional reversed prongs.

Each cycle of the punch press 51 punches one prong in the formed strip. When a prong has been formed, the strip advances into position for the next prong to be formed. When a sufficient length of the strip is advanced under the knife 52 (FIG. 1), the cut-off switch 293 is actuated, and a trim length is cut from the strip.

The machine llustrated in the drawings and described above is subject to structural modification without departing from the spirit and scope of the appended claims.

Having described my invention, what I claim as new and desire to secure by Letters Patent is:

1. A strip feed control device for a continuous feed machine for supplying a strip to an intermittent feed machine which comprises means for controlling the speed of the continuous feed machine, a shaft connected to the speed control means, a pair of gears rotatably mounted on the shaft, means for causing one of the pair of gears to turn in timed relation to the strip supplied by the continuous feed machine, means for causing the other of the pair of gears to turn in timed relation to the feed of the strip to the intermittent feed machine, the gears turning in opposite directions, and a gear mounted on the shaft and extending radially thereof and meshing with both of the gears of the pair so that the shaft turns when the continuous feed and the average of the intermittent feed vary, the shaft actuating the speed control means in a direction to change the rate of the continuous feed toward the average rate of the intermittent feed.

2. A feed control device as in claim 1 wherein an elongated loop links the strip supplied by the continuous feed machine and that fed to the intermittent feed machine, the loop varying in diameter with variations in rate of advance of strip portions.

3. A carriage advance control assembly for a machine having an oscillating carriage which comprises a turret, a plurality of gauge pins mounted in the turret, each of said gauge pins being advanceable into a carriage stopping position at which advance of the carriage is arrested by said one of the gauge pins, a hook stop arresting the turret when said one of the gauge pins is at said position, a cam operating in timed relation to the carriage for releasing the hook stop when the carriage is free of said one of the gauge pins, means for urging the hook stop to turret arresting position when released by the cam, and means urging the turret to advance in indexing direction, the turret urging means driving the turret when the hook stop is released to bring another gauge pin into carriage arresting position.

4. A control assembly as in claim 3 wherein the turret urging means includes a slip clutch which constantly urges the turret in indexing direction.

5. A control assembly as in claim 3 wherein the turret urging means includes a pulley connected to the turret, a belt running on the pulley, and means for driving the belt, the belt being adapted to slip when the turret is arrested.

6. A control assembly as in claim 3 wherein the hook stop is engageable with the gauge pins for arresting the turret.

References Cited

UNITED STATES PATENTS

| 2,988,938 | 6/1961 | Shuck et al. | 226—117 X |
| 3,174,670 | 3/1965 | Zernov | 226—117 |
| 3,285,113 | 11/1966 | Bertoglio | 226—117 X |

ALLEN N. KNOWLES, Primary Examiner

U.S. Cl. X.R.

226—117, 123, 141